INVENTOR
RICHARD F. RUTZ
BY Lester H. Clark
ATTORNEY

June 13, 1967 R. F. RUTZ 3,325,703

OSCILLATOR CONSISTING OF AN ESAKI DIODE IN DIRECT SHUNT WITH AN IMPEDANCE ELEMENT

Original Filed Aug. 5, 1959 3 Sheets-Sheet 2

United States Patent Office 3,325,703
Patented June 13, 1967

3,325,703
OSCILLATOR CONSISTING OF AN ESAKI DIODE IN DIRECT SHUNT WITH AN IMPEDANCE ELEMENT

Richard F. Rutz, Cold Spring, N.Y., assignor to International Business Machines Corporation, New York, N.Y., a corporation of New York Original application Aug. 5, 1959, Ser. No. 831,751, now Patent No. 3,249,891, dated May 3, 1966. Divided and this application Apr. 30, 1964, Ser. No. 364,030
5 Claims. (Cl. 317—234)

This application is a division of my copending application Ser. No. 831,751, filed Aug. 5, 1959, for Oscillator Apparatus Utilizing Esaki Diode, now issued as Patent 3,249,891 on continuation application Ser. No. 409,624.

This invention relates to semiconductor devices, and more particularly to an impedance unit.

The present invention is concerned primarily with an impedance unit suitable for operation at very high frequencies, e.g., in the range from a few megacycles to thousands of megacycles.

The impedance units described herein employ a semiconductor device known as an Esaki diode. An article in the Physical Review for January 1957, on pages 603–604, entitled "New Phenomenon in Narrow Germanium P-N Junctions" by Leo Esaki, describes a semiconductor structure which has come to be known as an "Esaki diode," sometimes alternatively referred to as a "tunnel diode." As described by Esaki this diode is a PN junction device in which the junction is very thin, i.e. narrow, in the currently accepted conventional terminology (on the order of 150 Angstrom units or less), and in which the semiconductor materials on both sides of the junction have high impurity concentrations (of the order of $10^{19}$ net donor or acceptor atoms per cubic centimeter for germanium).

The Esaki diode has several unusual characteristics. One is that the reverse impedance is very low, approaching a short circuit. Another is that the forward potential-current characteristic has a negative resistance region beginning at a small value of forward potential (on the order of .05 volt) and ending at a larger forward potential (of the order of 0.2 volt). The potential value at the low potential end of this negative resistance region is very stable with respect to temperature. It does not vary appreciably over a range of temperatures varying from a value near zero degrees K. to several hundred degrees K. At potential values outside the limited range described above, the forward resistance of the Esaki diode is positive.

The Esaki article identified germanium as a semiconductor material having this property, and did not identify the impurity materials with which the phenomenon was observed. Further research has led to the belief that this phenomenon can be observed with any semiconductor material at some temperature level, providing suitable donor and acceptor materials are available. The donor and acceptor materials must be capable of alloying into the matrix material with sufficient concentration to make the extrinsic material degenerate.

In this specification, a P type semiconductor is said to be degenerate if the Fermi level is either within the valence band or, if outside the valence band, it differs from the valence band edge of the energy gap by an energy not substantially greater than $kT$, where $k$ is Boltzmann's constant and T is the temperature in degrees K. Similarly, an N type semiconductor is said to be degenerate if the Fermi level is either within the conduction band or, if outside the conduction band, it differs from the conduction band edge of the energy gap by an energy not substantially greater than $kT$.

In order that a semiconductor junction may have Esaki diode characteristics, the P and N type materials must be such that the valence band of the P type material overlaps the conduction band of the N type material. It is also necessary that the junction between the P and N type materials be very thin, i.e., on the order of 150 Angstrom units or less. Furthermore, it is preferable that the top of the valence band be above the Fermi level on the P side, and that the bottom of the conduction band be below the Fermi level on the N side. It has now been found that acceptor materials which may be introduced into germanium with sufficient concentrations to produce the Esaki effect include gallium, aluminum, boron and indium. Suitable donor materials for germanium include arsenic and phosphorus.

An object of the present invention is to provide an improved impedance unit.

Another object is to provide an improved impedance unit having a substantially fixed natural frequency of oscillation.

A further object is to provide an improved impedance unit formed from a semi-conductor monocrystal.

Theh foregoing objects of the invention are attained in the structures described herein. The impedance unit comprises a semiconductor device including an Esaki diode and a resistive impedance which may be connected across the terminals of the diode by conductor elements. The resistive impedance may be a second semiconductor diode, a second Esaki diode, a linear resistance, or a nonlinear resistance. The Esaki diode and the resistive impedance may be constructed as parts of the same semiconductor monocrystal.

The presently preferred method of making an impedance unit of the type disclosed starts with a body of degenerate semiconductor material having conductivity of one type. Into two spaced regions on one surface of the body are alloyed two dots of impurity materials, at least one of which is effective to introduce in the body conductivity of the opposite type. The body may then be mounted on a wide area base. All those portions of the body except the regions containing the impurity materials and the portions between those regions and the base may then be etched away. A wide area electrically conductive element is then placed in electrical contact with the ends of the two regions opposite the wide area base.

Other objects and advantages of the invention will become apparent from a consideration of the following specification and claims, taken together with the accompanying drawings.

Figure 1:
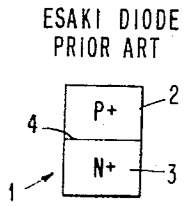
FIG. 1 is a schematic illustration of an Esaki diode.
Figure 2:
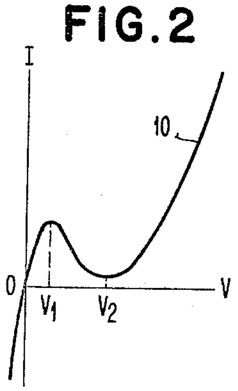
FIG. 2 is a graphical illustration of a potential-current characteristic of such a diode.
Figure 3:
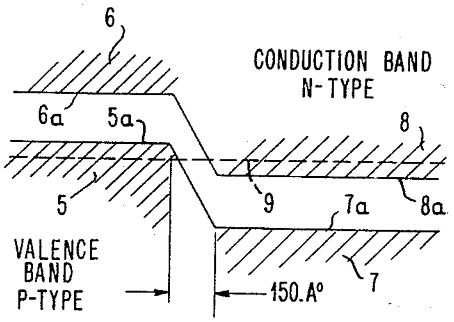
FIG. 3 is an energy diagram of the conduction and valence bands in the diode of FIG. 1.

*FIGS. 1 to 3*

These figures illustrate diagrammatically an Esaki diode and its principal operating characteristics. Such a diode comprises a body of semiconductor material, such as shown at 1 in FIG. 1, including a P+ region 2 and an N+ region 3, separated by a barrier junction 4 having quantum mechanical tunneling characteristics. At least one of the two regions is of degenerate material. Preferably both are degenerate, but it is possible to get typical Esaki diode characteristics from a diode wherein one of the two regions is degenerate and the other is nearly so.

Referring to FIG. 3, there is shown an energy diagram in which the P type material has a valence band 5 with an upper edge 5*a*, and a conduction band 6 with a lower edge 6*a*. The N type material similarly has a valence band 7 with an upper edge 7*a* and a conduction band 8 with a lower edge 8*a*. The edges 5*a*–6*a* and 7*a*–8*a* define the energy gap in the materials.

The Fermi level is shown by the dotted line 9, and is within the valence band of the P type material and within the conduction band 8 of the N type material.

It is essential, to secure Esaki diode characteristics, that the conduction band of the N type material overlap the valence band of the P type material. It is also preferable that the Fermi level be within the valence band of the P type material and within the conduction band on the N type material. It must be within one of those two bands and at least close to (within $kT$) the other one. The diode must be produced by a method which will leave a barrier junction which is very narrow, i.e., of the order of 150 Angstrom units or less, as indicated in the diagram.

When the emitter material is germanium, the concentration of impurity materials must be at least of the order of $10^{19}$ net donor or acceptor atoms per cubic centimeter. Suitable acceptor materials include gallium, aluminum, boron and indium. Suitable donor materials include arsenic and phosphorus.

Silicon, indium, antimonide, and gallium antimonide and gallium arsenide have also been reported as suitable semiconductor materials. It is considered that any semiconductor material may be used to construct a junction having Esaki characteristics at some temperature range, provided donor and acceptor materials are available which permit sufficiently high concentrations of impurity atoms.

In general, semiconductors having a characteristic narrow energy gap will produce Esaki diodes having lower capacitances than those produced from semiconductors having a wider gap. Therefore, the narrow gap semiconductors should be more suitable for higher frequencies.

FIG. 2 shows at 10 a typical potential-current characteristic of an Esaki diode, taken at a particular temperature. Note that in the negative potential or reverse impendance region, the slope of the characteristic is very steep, indicating that the resistance of the diode is very low, being practically a short circuit. In the positive potential, or forward conduction region, the characteristic has a positive resistance between zero and the potential $V_1$, a negative resistance between the potentials $V_1$, a negative resistance between the potentials $V_1$ and $V_2$ and a positive resistance above $V_2$. The Esaki diode is very stable as to the $V_1$ potential value, for a wide range of temperatures. The $V_2$ value may vary somewhat with temperature and the slopes of the various portions of the characteristic vary with temperature. However, a negative resistance region at potentials just higher than $V_1$ is retained at all temperatures below the temperature at which the material becomes effectively intrinsic.

Figure 4:
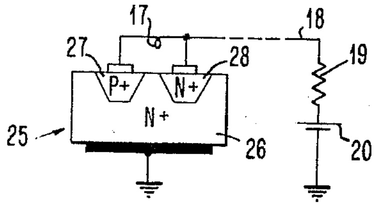
FIGS. 4 and 4A illustrate impedance units embodying the invention in oscillator circuits.
Figure 4A:
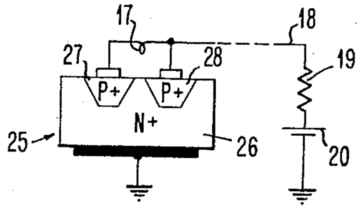
Figure 5:
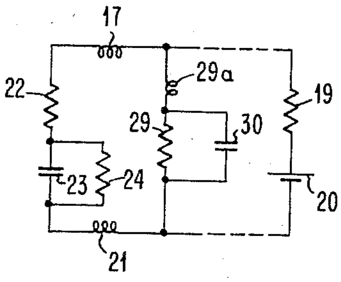
FIG. 5 is a wiring diagram of an equivalent circuit of the oscillators of FIGS. 4 and 4A.

*FIGS. 4, 4A and 5*

FIG. 4 illustrates an oscillator including an impendance unit 25 constructed in accordance with the invention. The impendance unit 25 of FIG. 4 consists of a semiconductor monocrystal. The principal region of the body is indicated by the reference numeral 26 and may consist of germanium having an impurity concentration therein sufficient to produce conductivity of the N type, the concentration of impurity being high enough so that the material is degenerate. In the body 26 there are alloyed two regions 27 and 28. The region 27 has an impurity which produces therein P type conductivity, and the concentration of impurities is sufficient to make the material degenerate. The region 28 has impurities which produce N type conductivity, but the concentration is higher than in the region 26 so as to produce a boundary between regions 28 and 26 where the conductivity changes sharply. Alternatively, the region 28 may be replaced by an ohmic connection, e.g., a soldered connection.

The region 27 is connected through an inductor 17 to the region 28. The region 28 is also connected through a lead line 18 of indeterminate length, indicated in the figure by having a portion of it shown dotted, and through a resistor 19 and a battery 20 to ground. The resistor 19 and battery 20 serve as a power supply for the oscillator.

FIG. 5 illustrates an equivalent circuit with lumped parameters for the oscillator of FIG. 4. In FIG. 4, the regions 26 and 27 together form an Esaki diode. The regions 26 and 28 taken together may form a diode with conventional diode characteristics rather than Esaki diode characteristics, providing the impurity concentrations in the two regions do not match. If the concentrations match, then these two regions may be considered a resistor.

Referring to FIG. 5, the elements in this figure which correspond directly in structure and in function to physical elements in FIG. 4 have been given the same reference numerals. The ground connections are replaced by an inductor 21. The Esaki diode formed from the regions 26 and 27 is replaced by a resistor 22 in series with a capacitor 23 and a negative resistor 24 in parallel with the capacitor 23. The N+ regions 26 and 28 taken together are replaced by an inductance 29*a* in series with a resistor 29 and a capacitor 30 in parallel with the resistor 29. Region 28 of FIG. 4 may alternatively be P+, as illustrated in FIG. 4A, in which case the capacitor 30 becomes more pronounced. These regions 28, 26 then define a junction having more typical diode characteristics, which may be either conventional or Esaki.

Figure 7:
FIG. 7 is a graphical illustration of the wave form produced by an oscillator utilizing an impendance unit embodying the invention.

The wave produced by the oscillator of FIG. 4, illustrated by the curve 31 of FIG. 7, is nearly sinusoidal, especially for those cases where capacitance 30 is appreciable. The added capacitance 30 of the diode between the regions 26 and 28 apparently has the effect of smoothing the output wave.

Figure 6:
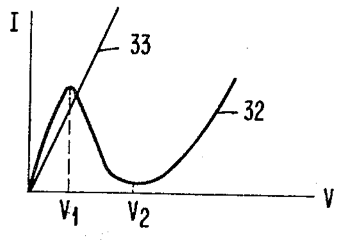
FIG. 6 is a graphical illustration of the potential-current characteristics of the diode and resistive impedance of an impendance unit embodying the invention.

Referring to FIG. 6, there is shown a potential-current characteristic 32 of a typical Esaki diode, which may be the diode formed from regions 26 and 27 of FIG. 4, and a potential-current characteristic 33 of a typical resistor, which may be formed from regions 26 and 28 of FIG. 4. In order to have the circuit of FIG. 4 oscillate, the resistance of the resistor must be less than the negative resistance of the Esaki diode at the operating point in the region $V_1$–$V_2$ of the Esaki diode characteristic. If the resistance of the resistor is smaller than the negative resistance of the Esaki diode, then the overall resistance of the loop through the impedance unit will be negative, and the circuit will begin to oscillate by charging and discharging the capacitance at the Esaki diode junction.

Whether the resistor or its counterpart is a linear resistor, a nonlinear resistor, conventional diode, or an Esaki diode, there are two essential requirements for oscillation. One is that the potential-current characteristic of the Esaki diode be sufficiently different from the characteristic of the resistor or its counterpart so that the two characteristics intersect. The other requirement is that the resistance of the resistor or its counterpart be lower than the negative resistance of the Esaki diode at the operating point, which may be defined as the median potential of the range used in oscillating.

*FIGS. 8–12*

Figure 12:
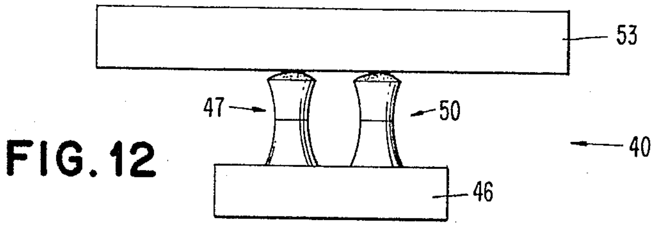

These figures illustrate an improved method of making a semiconductor device such as the device 25 of FIG. 4 or, by extending the method further, a device such as that shown at 40 in FIG. 12.

Figure 8:
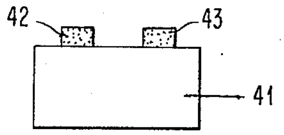
FIG. 8–12 illustrate five successive steps in a method of making an impendance unit embodying the invention.
Figure 9:
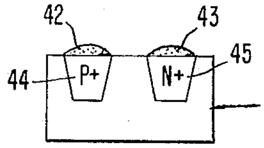
Figure 10:
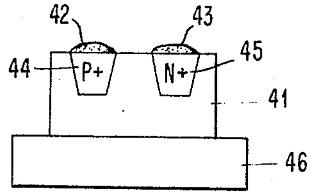
Figure 11:
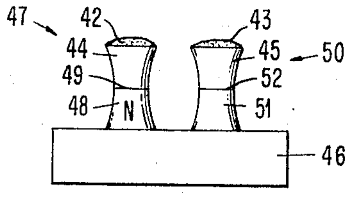

In FIG. 8 there is shown a body 41, which may be of germanium, heavily doped with arsenic to provide a density of at least $10^{19}$ arsenic atoms per cubic centimeter. On the top of the body 41 rest two small pieces, commonly called dots, of donor and acceptor materials respectively. The acceptor dot, shown at 42, may be an alloy known as tin gallium. The donor dot, shown at 43, may be another alloy known as tin arsenic.

The body 41, with the dots resting thereon, is heated from the bottom. The heating may be carried out by placing the body 41 on an electrical resistance heater inside a bell jar. The heating should be done very quickly, while observing the condition of the two dots. A heating period of the order of a few seconds is preferred. The heat is applied until the two dots melt and start to spread and wet the surface of the body 41. This spreading and wetting of the surface is an indication that the heating has proceeded far enough, and that the materials of the two dots have been alloyed into the body 41 to produce therein a P+ region 44 and an N+ region 45. In both of these regions the concentration of impurity atoms is sufficient to make the material degenerate.

The body 41 is then mounted on a base 46, which may be of any suitable electrically conductive material. Mounting may be done by soldering, brazing, or the like. The device as so far constructed is essentially the same as the device 25 of FIG. 4.

It is preferred to subject the device to further treatments, beginning with any suitable selective etching process, many of which are well known in the art. For example, electrolytic etching using a solution of KOH, 5% by weight, may be used. In this etching process the semi-conductor body 41 is etched away, except in the regions between the dots 42 and 43 and the base 46. After the etching is completed there remains a diode 47 between the dot 42 and base 46, consisting of the P+ region 44 and the N+ region 48, separated by a boundary junction 49. Another semiconductor device, which may be either a linear or nonlinear resistor, or a diode, is generally indicated by the reference numeral 50 and includes the N+ region 45 separated from another N+ region 51 by a boundary junction 52.

The final step of the process as indicated in FIG. 12 consists in connecting an electrically conductive member, e.g., a plate 53, to the tops of the two diodes 47 and 50. The diode 47 is an Esaki diode and the diode 50 provides a low resistance connected across the terminals of the Esaki diode 47. The impedance unit of FIG. 12 is generally indicated by the reference numeral 40.

In the process of FIGS. 8 to 12, the original block 41 may have any convenient lateral dimensions. In one embodiment of the process, the thickness was about 0.001 in., the resistivity about 0.001 ohm-cm. The dots 42 and 43 were big enough to produce wetted areas about 0.005 in. in diameter and spaced apart about 0.006 in. center-to-center. After etching, the diodes under the dots were about 0.001 in. in diameter. The plate 53 was 0.003 in. thick (perpendicular to the plane of the paper), 0.08 in. high (the vertical dimension in the drawing) and 0.25 in. long (the horizontal dimension in the drawing).

One impedance unit so constructed, when connected to a suitable power supply, oscillated at a fundamental frequency of 2,500 megacycles.

Note that all the dimensions of the impedance unit are much smaller than a wave length. Furthermore, the dimensions are not critical and do not, as such, determine the freqeuncy.

As an alternative to the process described in FIGS. 8 to 12, the Esaki diode and the resistor or its diode counterpart could be made separately by any suitable processes and thereafter mounted close together to provide an impedance unit in accordance with the invention. If so constructed, the vertical dimensions of these two elements may conveniently be made equal, although that dimensional relation is by no means necessary.

*FIG. 13*

Figure 13:
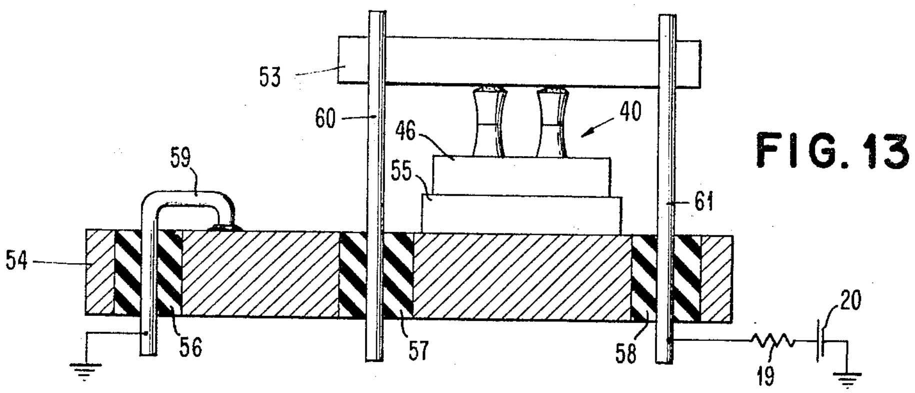
FIG. 13 illustrates the impedance unit of FIG. 12 mounted in a circuit.
Figure 14:
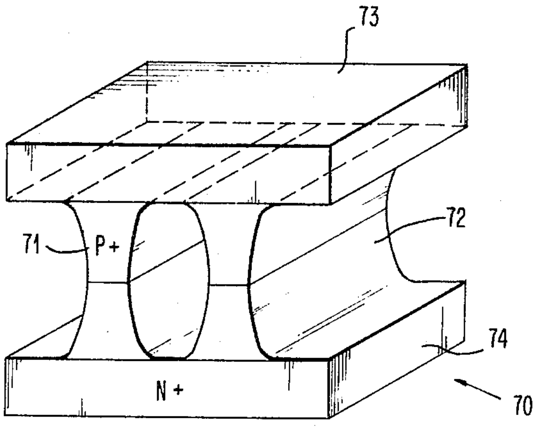
FIGS. 14, 15, 15A and 16 illustrate modified forms of impedance units embodying the invention.

This figure illustrates an impedance unit 40 mounted on a conventional support or header 54. For convenience in handling, the impedance unit 40 is first mounted on a small plate or tab 55 of nickel, which is in turn soldered to the top of the header 54. Three apertures are provided in the header 54 for receiving insulating bushings 56, 57, 58. Wires 59, 60 and 61 respectively extend through the three bushings. Wire 59 has its upper end, as it appears in the drawing, bent over and soldered to the upper surface of the header 54. Wire 60 extends upwardly and is soldered to the plate 53 of the impedance unit 40, at one end thereof. The wire 60 serves only to support and locate the unit, and no external electrical connection is made to it. Wire 61 has its upper end soldered to the plate 53. Its lower end is connected through the resistor 19 and battery 20 to ground. The lower end of wire 59 is grounded. It may be seen that the unit shown in FIG. 13 provides a complete oscillator circuit such as that shown in diagrammatic form in FIG. 4.

The plate 43 and the base 46 serve as both conductors and inductors, being electrically and mechanically equivalent to the inductors 17 and 21 in FIG. 5.

*FIG. 14*

This figure illustrates a modification of the impedance unit 40, this modification being generally indicated by the reference numeral 70. In this modification, the diodes 71 and 72, corresponding generally to the diodes 47 and 50, are substantially elongated, so as to increase the area of the boundary junctions therein. This increase in the junction area allows a substantial increase in the current flow and therefore in the power which may be derived from the oscillator. The plate 53 of the impedance unit 40 is replaced by a plate 73 whose dimensions have been increased to correspond to the increase in area of the junctions 71 and 72. While increasing the area of the junctions increases the capacitance in the circuit, the corresponding increases in the size of plate 73 and of the base 74 reduce the inductance in about the same proportion. Furthermore, all these increases in cross sectional area with respect to the current circulating in the impedance unit have the effect of reducing the resistance in the unit in the same proportion that the capacitance is increased. The net effect is that the power rating of the impedance unit is substantially increased, without substantially affecting the frequency.

Figure 15:
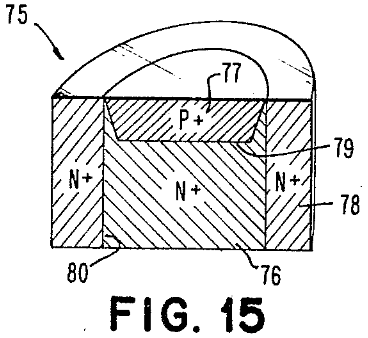
Figure 15A:
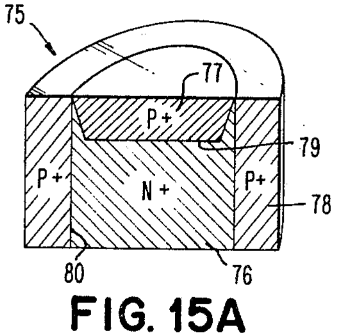
Figure 16:
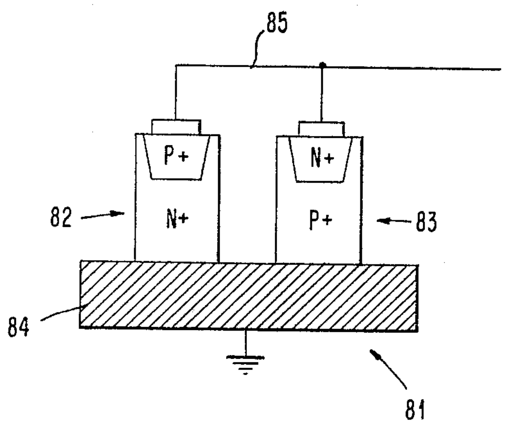

*FIGS. 15 and 15A*

These figures illustrate a modified form of impedance unit structure comprising a cylindrical body generally indicated by the reference numeral 75 and having a central lower N+ region 76 with an overlying P+ region 77. Both the regions 76 and 77 are of degenerate semiconductor material. The regions 76 and 77 are encircled by an annular region 78. The annular region 78 should have a low resistance as specified above, which may be secured, for example, by making it either of low resistivity non-degenerate or degenerate N (FIG. 15) or P (FIG. 15A) type semiconductor material. Region 78 should have conductive contact with the region 77, at least at one locality on the periphery of region 77. The regions 76 and 77 are separated by boundary junction 79 which has the characteristics of an Esaki diode. The regions 76 and 78 are separated by a boundary junction 80 having conventional diode characteristics. Alternatively, the regions 76 and 78 may be homogeneous. The junction

80 corresponds to the diode or resistor 50 in the impedance unit 40 of FIGS. 12 and 13, whereas the junction 79 corresponds to the junction of the Esaki diode 47.

The device shown at 75 may be made by taking a body of semiconductor material having the conductivity characteristic desired for the region 76 and diffusing into it from the outside an acceptor or donor material effective to produce in the annular region 78 the N (FIG. 15) or P (FIG. 15A) type characteristics required. The P+ region 77 may then be alloyed into the region 76 by the same techniques described in FIGS. 8–10.

*FIG. 16*

This figure illustrates another form of impedance unit for an oscillator embodying the invention. The impedance unit 81 comprises two Esaki diodes 82 and 83, mounted side by side on a base 84 of conductive material, and with their polarities opposed. Since an Esaki diode has a very low resistance in its reverse direction, the diode 83, whose polarity is reversed as compared to the battery 20 connected as in FIG. 4, acts as a low resistance load on the diode 82. If the potential of battery 20 were reversed, then the diode 83 would act as the Esaki diode and the diode 82 would act as a low resistance load. The conductor 85 connecting the upper terminals of the diodes 82 and 83, as they appear in the drawing, has substantial inductance at the frequency involved.

Alternatively, one of the two Esaki diodes 82 and 83 may be inverted, providing their characteristics are sufficiently different so that they intersect, and their impedances at the operating point meet the requirements specified above.

*Conclusion*

While I have shown and described certain preferred embodiments of my invention, other modifications thereof will readily occur to those skilled in the art, and I therefore intend my invention to be limited only by the appended claims.

I claim:

1. An impedance unit comprising a body of semiconductor material having first and second degenerately doped regions and circuit bias means connected to said first and second regions for producing tunneling; a separate resistive impedance element integrally formed with said body; and means connecting said first and second regions in direct shunt with said integrally formed resistive impedance element.

2. An impedance unit as defined in claim 1, wherein said resistive impedance element is constituted of monocrystalline semiconductor material.

3. An impedance unit as defined in claim 2, wherein said body of semiconductor material and said resistive impedance element of semiconductor material are constituted of the same monocrystalline wafer.

4. An impedance unit as defined in claim 3, wherein said resistive impedance element comprises a PN junction formed in said monocrystalline wafer.

5. An impedance unit as defined in claim 4, wherein said PN junction is a tunnel diode junction.

References Cited

UNITED STATES PATENTS

| | | | |
|---|---|---|---|
| 2,778,956 | 1/1957 | Dacey | 307—88.5 |
| 3,027,501 | 3/1962 | Pearson | 317—234 |
| 3,098,160 | 7/1963 | Noyce | 307—88.5 |
| 3,114,864 | 12/1963 | Sah | 317—234 |
| 3,131,096 | 3/1964 | Sommers | 148—33 |
| 3,178,797 | 4/1965 | Gunn | 29—25.3 |
| 3,249,891 | 5/1966 | Rutz | 331—107 |

OTHER REFERENCES

Leo Esaki: Phys. Rev., vol. 109 p. 603, 1958.

JOHN W. HUCKERT, *Primary Examiner.*

M. EDLOW, *Assistant Examiner.*